United States Patent [19]

Norris et al.

[11] 4,030,347
[45] June 21, 1977

[54] BIAXIAL CAPACITANCE STRAIN TRANSDUCER

[75] Inventors: Elwood B. Norris; Lester M. Yeakley, both of San Antonio, Tex.

[73] Assignee: Electrical Power Research Institute, Palo Alto, Calif.

[22] Filed: Oct. 31, 1975

[21] Appl. No.: 627,590

[52] U.S. Cl. .............................. 73/88.5 R; 361/283
[51] Int. Cl.² ......................................... G01B 7/22
[58] Field of Search ................ 73/88.5 R; 317/246; 340/200; 323/93

[56] References Cited

UNITED STATES PATENTS

| | | | |
|---|---|---|---|
| 3,729,991 | 5/1973 | Hardway, Jr. | 73/136 A |
| 3,784,897 | 1/1974 | Norrie | 323/93 |

OTHER PUBLICATIONS

Foldvari et al., "Capacitive Transducers", Instruments & Control Systems, vol. 37, Nov. 1964, pp. 77-85.

*Primary Examiner*—Charles A. Ruehl
*Attorney, Agent, or Firm*—Townsend and Townsend

[57] ABSTRACT

A biaxial capacitance strain transducer in the form of a laminated structure defining two capacitance strain transducers in orthogonal orientation. Each capacitance strain transducer comprises driven capacitance plates which are excited by an oscillator and a sensing capacitance plate disposed in spaced parallel relation to the driven capacitance plates. A shutter mechanism in the form of a pair of apertured plates is provided between the driven plates and the sensing plates. The ends of the apertured plates extend out of the laminated structure and are attached to the surface wherein strain is to be measured. Strain will produce relative displacement of the apertured plates, resulting in variation in the capacitive coupling between the sensing and driven plates through the apertures. This differential capacitance, which is thus related to the strain to be measured, is detected and measured by suitable electronic instrumentation.

26 Claims, 6 Drawing Figures

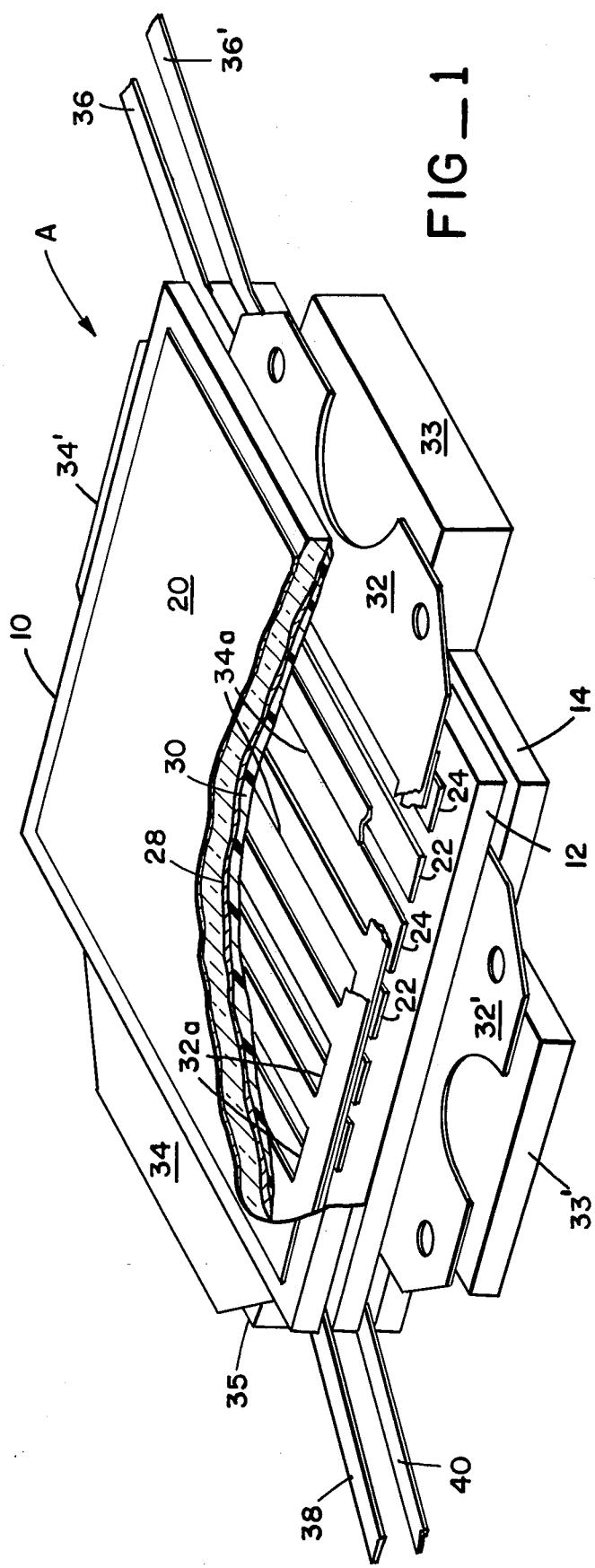
FIG_1
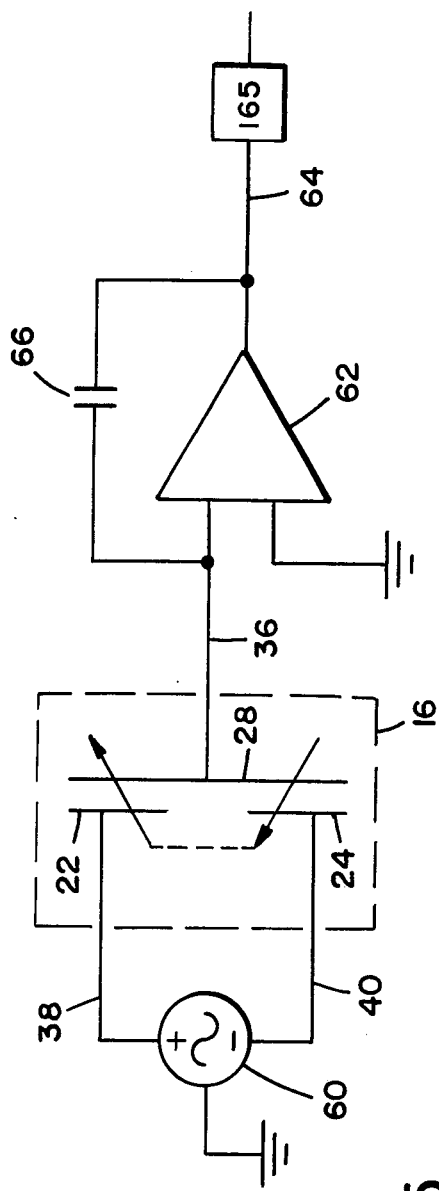
FIG_5

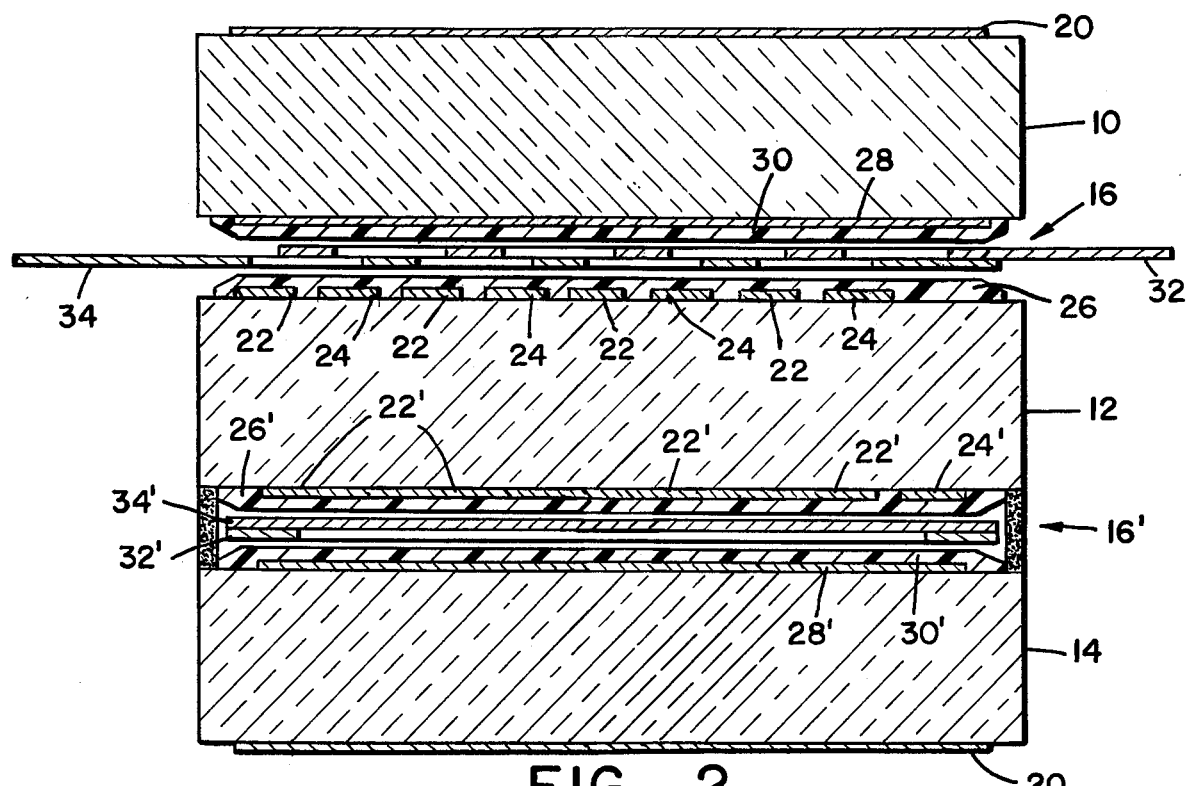
FIG_2
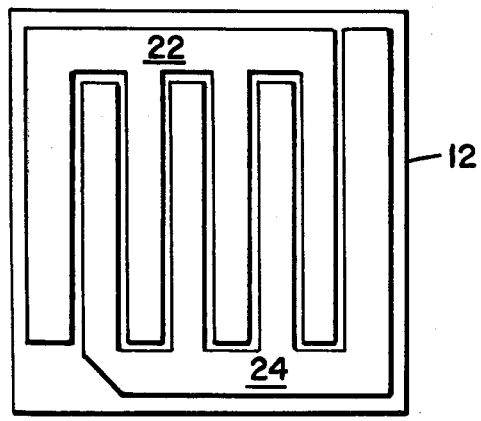
FIG_3a
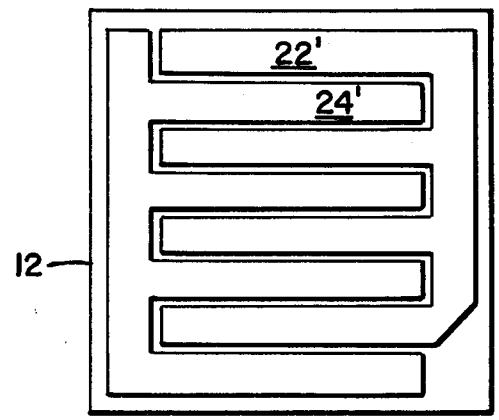
FIG_3b
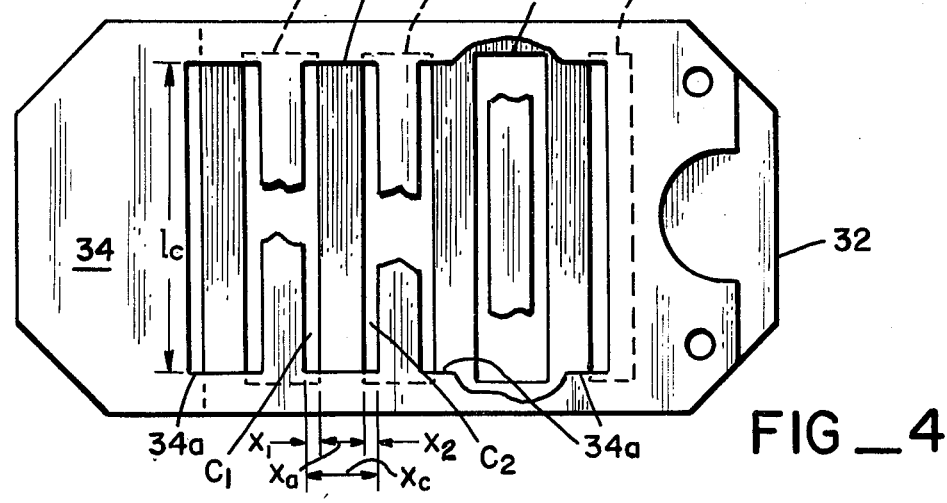
FIG_4

BIAXIAL CAPACITANCE STRAIN TRANSDUCER

This invention was made under contract with or supported by the Electric Power Research Institute, Inc.

This invention relates to apparatus for the measurement of strain, and more particularly, to a biaxial capacitance strain transducer.

Analysis of the stresses or forces acting upon the various elements of a structure is generally desired in order to insure that the elements are suitably constructed to bear the stresses imposed with a suitable margin for safety. While stresses may be readily calculated in simple structures bearing known loads, such calculations are often unduly complex and in many instances virtually impossible, for complicated structures and/or unknown loads. Thus, in many applications, it is desirable to derive the stresses empirically. In general, stresses are not capable of direct measurement. Rather, the strain or deformation of a material, which is directly related to the stress is measured by the use of strain gauges.

A strain gauge or transducer is thus a device which exhibits a change in an electrical property in response to the strain or defomation of the material to which it is affixed. The resistance strain gauge is the most common type, comprising a wire which exhibits a change in electrical resistance when stretched. The resistance strain gauge wire is affixed to the surface of the material wherein strain is to be measured, so that the strain will produce a related change in resistance. Suitable electronic circuitry, typically comprising a Wheatstrone bridge, is employed to detect and measure the change in resistance and thus the strain.

Unfortunately, wires which have desirable characteristics for use in resistance strain gauges generally exhibit changes in resistance in response to temperature changes. Over the short term, these changes may be compensated for with temperature compensation circuitry. However, prolonged exposure to elevated temperatures may result in changes in resistance, caused by a phenomena known as thermal aging, which generally cannot be compensated for.

An alternative type of strain gauge or transducer employs change in electrical capacitance in response to strain as the measured property. Heretofore, capacitance strain transducers have been constructed in such a manner that the operative elements of the device are under stress. In these capacitance strain transducers, and in resistance strain transducers which similarly impose stresses upon the electrical resistance element, the electrical properties of the devices tend to change with long exposure to stress, as a result of a permanent deformation of the stressed elements, such phenomena generally being referred to as "creeping." As a consequence of creeping, and thermal aging, strain transducers are generally unstable when employed over long periods of time, particularly at elevated temperatures.

In general, strain gauges are unidirectional, i.e. responsive only to dimensional changes in a single direction. In order to accurately analyze the stresses at a location, it is necessary to measure the strain in at least two directions, from which the true magnitude and orientation of the strain may be determined. To this end, two or more strain gauges may be mounted in close proximity on the surface under examination, with a known angular offset therebetween. This approach tends to be inaccurate as the strains actually measured are not at precisely the same location. Thus, strain gauges capable of being stacked to form a multi-axial transducer responsive to strains in different directions detected at substantially the same location on the surface of the material under examination are generally preferable.

It is thus an object of the present invention to provide a capacitance strain transducer exhibiting improved long-term stability.

Another object of the present invention is to provide a capacitance strain transducer substantially unaffected by thermal aging and creeping.

Still another object of the present invention is to provide a capacitance strain transducer construction particularly well suited for stacking to form a multi-axial capacitance strain transducer.

Yet another object of the present invention is to provide a capacitance strain transducer of simple, reliable and accurate construction.

To these ends, the preferred embodiment of the present invention provides a biaxial capacitance strain transducer in the form of a laminated structure defining two capacitance strain transducers in orthogonal orientation. Each capacitance strain transducer comprises driven capacitance plates which are excited by an oscillator and a sensing capacitance plate disposed in spaced parallel relation to the driven capacitance plates. A shutter mechanism in the form of a pair of apertured plates is provided between the driven plates and the sensing plates. The ends of the apertured plates extend out of the laminated structure and are attached to the surface wherein the strain is to be measured. Strain will produce relative displacement between the apertured plates, resulting in variation in the capacitive coupling between the sensing and driven plates through the apertures.

This differential capacitance is thus related to the strain to be measured and is detected and measured by suitable electronic instrumentation. Specifically, two equal amplitude but 180° out of phase signals from the oscillator are applied to the driven plates of each strain gauge. The shutter mechanism formed by the apertured plates functions to decrease the capacitance between one driven plate and the sensing plate while simultaneously increasing the capacitance between the other driven plate and the sensing plate, in response to the strain. The resulting change in the signal levels is detected by a phase-sensitive demodulator, producing an analog signal proportional to the strain.

Since the apertured plates forming the shutter mechanism of the capacitance strain transducer according to the present invention are not under stress, the effects of creeping are substantially eliminated. Moreover, all of the capacitance plates are held in stable reference to each other, to further minimize the effects of thermal aging and creeping, resulting in a capacitance strain transducer of improved long term stability.

The electronic instrumentation employed with the biaxial capacitance strain transducer according to the present invention is relatively unaffected by amplifier drift or spurious signals. Specifically, the outputs of the strain transducer may be held at virtual ground by the use of suitable negative feedback in conjunction with the amplifiers connected to the outputs of the transducer. Thus, if the capacitances between the driven plates and the sensing plate are not balanced, the output of the amplifier will deliver, via the feedback path, the necessary charge to return the input to virtual ground potential. With the output leads of the capacitance transducer at ground potential, there is no sensitivity to capacitance between these leads and ground. Thus, a grounded shielded cable may be employed to shield the leads from spurious signals. The leads from both sensing plates in the biaxial transducer can be run in the same shield without cross-talk. The cables may be long and may be whipped about without deleterious effect.

These and other objects, features and advantages of the present invention will be more readily apparent from the following detailed description, wherein reference is made to the drawings, in which:

FIG. 1 is a perspective view, partially broken away, of a biaxial capacitance strain transducer according to the preferred embodiment of the present invention;

FIG. 2 is a side cross-sectional view of the apparatus depicted in FIG. 1;

FIGS. 3a and 3b are plan views of the driven capacitance plates of the apparatus depicted in FIG. 1;

FIG. 4 is a plan view, partially broken away, of the apertured plates forming a shutter mechanism in the apparatus depicted in FIG. 1;

FIG. 5 is a schematic diagram of the biaxial capacitance strain transducer according to the present invention with associated electronic circuitry.

Referring intitially to FIGS. 1 and 2, there is depicted a biaxial capacitance strain transducer A according to the preferred embodiment of the present invention. Transducer A generally comprises three support wafers or lamina 10, 12 and 14 arranged in a stack, defining two slots therebetween. A first capacitance strain transducer 16, responsive to strain in a first direction or axis is formed in the slot between the adjacent spaced-apart surfaces of wafers 10 and 12. Similarly, a second strain transducer 16' is formed in the slot between the adjacent, spaced-apart surfaces of wafers 12 and 14. The second strain transducer 16' is responsive to strain in a second direction or axis orthogonal to the first axis.

Thus, in accordance with the preferred embodiment of the present invention, second transducer 16' is substantially identical in construction to first transducer 16 but is angularly offset therefrom by 90° in order to render the response axes of the transducers orthogonal. Accordingly, only first transducer 16 will be described in detail, it being expressly understood that such description is equally applicable to second transducer 16'. For ease of understanding, corresponding elements in second transducer 16' are designated in the drawings by the same reference numbers employed with respect to first transducer 16 with the addition of a prime designation, e.g. elements 22, 24, etc. of first transducer 16 correspond to elements 22', 24', etc. of second transducer 16'.

Transducer 16 comprises a pair of driven capacitance plates 22 and 24 provided on the surface of wafer 12 interior of the slot. Plates 22 and 24 are referred to as driven plates because they are excited with signals from the electronic instrumentation employed with the transducer. Referring to FIG. 3a, driven plates 22 and 24 are co-planar and configured in the form of a series of parallel elongate projections or fingers joined together along their bases. The fingers of driven plates 22 and 24 are interposed to define a parallel row of alternate fingers of the driven plates 22 and 24. As will be more readily apparent hereinafter, the fingers of the driven plates 22 and 24 extend perpendicular to the strain response axis of the transducer 16. Thus, with reference to FIG. 3b, wherein the driven plates 22' and 24' of second transducer 16' are depicted, it is apparent that driven plates 22' and 24' are rotated 90° with respect to driven plates 22 and 24, rendering the strain response axis of transducer 16' orthogonal to the strain response axis of transducer 16.

A dielectric coating 26 is provided over driven capacitance plates 22 and 24. Dielectric layer 26 functions to insulate the driven plates 22 and 24 from the other elements of the transducer 16. A corner of each of the driven plates 22 and 24 is left uninsulated so that electrical leads 38 and 40 may be attached to the respective driven plates 22 and 24, typically by spot welding.

A sensing capacitance plate 28 is provided on the surface of support wafer 10 interior of the slot. Sensing plate 28 is thus maintained in parallel spaced-apart relation to driven plates 22 and 24. Sensing plate 28 is generally rectangular, corresponding to the region of the interposed fingers of driven plates 22 and 24. Sensing plate 28 is so-called because it is connected to suitable electronic instrumentation to detect the change in differential capacitance to the driven plates 22 and 24. An electrical lead 36 is thus attached to the sensing plate, preferably by spot welding at a corner of the plate. The surface of sensing plate 28 is covered by a dielectric layer 30, similar to dielectric layer 26 covering driven plate 22 and 24, to insulate sensing plate 28 from the remaining elements of the transducer 16.

Referring to FIGS. 2 and 4, a shutter mechanism is provided between the driven plates 22 and 24 and the sensing plate 28, in the form of apertured plates 32 and 34. Apertured plates 32 and 34 are carried in the slot defined between the support wafers 10 and 12 for movement along the strain response axis of the transducer 16. Apertured plates 32 and 34 extend outwardly from the support wafers 10 and 12, on opposite sides thereof for attachment to the surface wherein strain is to be measured. To this end, a pair of spacers 33 and 35 are respectively mounted to the external ends of the apertured plates 32 and 34. Spacers 33 and 35 are of thicknesses corresponding to the distance between the plates 32 and 34 and the surface wherein strain is to be measured. Thus, compression or extension of the surface wherein strain is to be measured will produce relative displacement between the apertured plates 32 and 34. This displacement is employed to vary the differential capacitance between driven plates 22 and 24 and sensing plate 28.

As best seen in FIG. 4, apertured plates 32 and 34 each comprise a plurality of rectangular apertures, respectively designated as 32a and 34a. Apertures 32a and 34a are oriented parallel to the fingers of driven plates 22 and 24. When apertured plates 32 and 34 are superimposed, the apertures 32a and 34a are offset, defining a plurality of elongate rectangular slots through the plates 32 and 34. In greater detail, each of the apertures 32a is centered with respect to an adjacent pair of the apertures 34a defining two capacitance slots C1 and C2 through the overlapping portions of the apertures 32a and 34a. Thus, the number of capacitance slots C1 and C2 corresponds to twice the number of apertures 32a and 34a in each one of the apertured plates 32 and 34.

There is thus provided an alternating series of capacitance slots C1 and C2 which differ from one another in that their dimensions vary oppositely when the apertured plates 32 and 34 are relatively displaced. Thus, inward displacement of the plates 32 and 34 will cause capacitance slots C1 to narrow, while simultaneously widening capacitance slots C2. Thus, in the transducer 16, the capacitance slots C1 are disposed adjacent the fingers of driven plate 22 whereas the capacitance slots C2 are disposed adjacent the fingers of driven plate 24. Accordingly, inward displacement of the apertured plates 32 and 34 will decrease the capacitance between driven plate 22 and sensing plate 28 while simultaneously increasing the capacitance between driven plate 24 and sensing plate 28. Similarly, outward displacement of the apertured plates 32 and 34 will increase the capacitance between driven plate 22 and sensing plate 28 while simultaneously decreasing the capacitance between driven plate 24 and sensing plate 28.

Thus, the basis of operation of the strain transducer is that the active capacitance between the sensing plate 28, and the driven plates 22 and 24 is defined by the relative position of the apertured plates. The active capacitance between driven plate 22 and sensing plate 28 is proportional to the area of the capacitance slot C1. Considering only one of the slots C1, and neglecting fringing effects, the capacitance between driven plate 22 and sensing plate 28 is:

$$C_1 = k\, x_1\, l_c$$

Where $k$ is a proportional constant dependent on the plate spacing and on the dielectric coefficient. Similarly, the capacitance between driven plate 24 and sensing plate 28 is:

$$C_2 = k\, x_2\, l_c$$

The differential capacitance, therefore, is:

$$C_d = C_1 - C_2 = k l_c\, (x_1 - x_2)$$

but since $$x_c = x_1 + x_a + x_2, \text{ then:}$$

$$C_d = k l_c\, (2x_1 + x_a - x_c)$$

Thus the differential capacitance is dependent upon the relative position of the apertured plates, as well as the dimensions of the apertures 32a and 34a and the constant $k$.

The sensitivity of the transducer to relative displacement of the apertured plates is expressed by:

$$K_x = N \frac{dC_d}{dx_1} = 2N\, k l_c$$

where N is the number of apertures 32a or 34a, only one of which was considered in the proceeding analysis.

As referred to briefly hereinbefore, the construction and operation of the orthogonal transducer 16' is substantially identical to that described with respect to transducer 16. Of course, transducer 16' is intended to be responsive to strains orthogonal to the strain response axis of transducer 16, and thus all of the elements of transducer 16' are rotated 90° with respect to the corresponding elements of transducer 16. In other respects, the construction and operation described heretofore is identical.

The biaxial capacitance strain transducer A according to the preferred embodiment of the present invention incorporates safeguards against interference and spurious signals. Specifically, a pair of shielding plates 20 are provided on the exterior surfaces of support wafers 10 and 14 and are grounded to shield the transducer A. Similarly, apertured plates 32, 34, 32' and 34' are grounded. If the transducer A is mounted on a grounded metallic surface, the ground to the apertured plates may be made through attachment to the surface on which strain is to be measured. Alternatively, when the transducer is used on an insulating or non-grounded surface, ground leads should be provided to the apertured plates. In addition to the shielding afforded by the shielding and apertured plates, additional isolation from interference and spurious signals is inherent in the electronic instrumentation employed with the transducer A, as will now be described.

Referring to FIG. 5, the electronic instrumentation employed with the transducer A will now be described in detail. Since the transducers 16 and 16' are substantially independent, duplicate electronic instrumentation channels are provided for each of the transducers 16 and 16', except that a single signal source to excite the transducers may be employed. The transducer 16 is driven by two equal amplitude, 180° out-of-phase carrier signals from an oscillator 60 having a very low output impedance. Thus, lead 38 connects a first phase output of oscillator 60 to driven plate 22. Similarly, lead 40 connects the second phase (180° out-of-phase from the first phase) output of oscillator 60 to driven plate 24. Since a single oscillator 60 may be employed to excite both transducers 16 and 16', and driven plates 22 and 22' are connected in parallel to lead 38, while driven plates 24 and 24' are connected in parallel to lead 40.

The transducer 16 may be regarded as two variable capacitors ganged to one another, in such a manner that the capacitances vary inversely to one another, as schematically illustrated in FIG. 5. The outputs of the two capacitors are in common, comprising sensing plate 28, connected to output lead 36. Absent imposed strain, the capacitance slots C1 and C2 formed by the apertured plates 32 and 34 are substantially identical in size, so that equal amplitudes of the first or in-phase oscillator signal and the second or out-of-phase oscillator signal will be coupled to sensing plate 28. The equal amplitude signals tend to cancel one another, rendering the output of the transducer 16 null absent imposed strain. Compression of the surface on which strain is to be measured causes capacitor slots C1 to narrow, while widening capacitor slots C2. This results in the reduction of the amplitude of the in-phase oscillator signal coupled to sensing plate 28 through capacitor slot C1 and the simultaneous increase in the amplitude of the out-of-phase oscillator signal coupled to sensing plate 28 through capacitor slot C2. Thus, compressive strain will produce an out-of-phase output signal on lead 36. Similarly, extensive strain will widen capacitor slot C1 while narrowing capacitor slot C2, resulting in an in-phase signal on output lead 36.

In order to detect and measure the signal appearing on output lead 36, lead 36 is connected to the input of a charge amplifier 62, for amplification. Charge amplifier 62 includes a feedback capacitor 66 coupling the output 64 with the input on lead 36. The negative feedback provided by capacitor 66 functions to hold lead 36 at a virtual ground potential. Specifically, the appearance of a signal on lead 36 will result in a feedback of charge to capacitor 66 sufficient to return lead 36 to a virtual ground. By maintaining the instrumentation leads 36 at virtual ground potential, sensitivity to change in cable capacitance and spurious signals is further diminished. Moreover, the instrumentation lead 36 may be run in a simple, grounded, shielded cable without deleterious effect. Instrumentation lead 36' associated with orthogonal transducer 16' may be run in parallel in the same shielded cable.

The output 64 of charge amplifier 62 may be applied to a phase sensitive detector 165 to produce a simple D.C. signal proportional to the differential capacitance and thus proportional to the strain. The detector 165 may be a demodulator employed to eliminate the A.C. carrier signals while preserving the pertinent amplitude information. The demodulator is preferably phase-sensitive in order to enable differentiation between compressive and extensive strain, which as previously described, will produce output signals of opposite phase.

While a variety of materials may be employed for the construction of the biaxial capacitance strain transducer A according to the present invention, certain materials have been found particularly well suited for use in high temperature environments. Specifically, support wafers 10, 12 and 14 are preferably formed of alumina, while the driven, sensing and shielding plates 20, 22, 24, 28, 22', 24' and 28' are preferably formed of platinum, printed on the surface of the support wafers 10, 12 and 14. The apertured plates 32, 34, 32' and 34' are preferably formed of stainless steel. The apertures 32a, 34a, 32a' and 34a' are conveniently formed by a conventional photo-etching process. The dielectric insulating layers 26, 30, 26' and 30' may comprise thin film ceramic while the leads 36, 36', 38 and 40 may be formed of nickel. All of these materials were selected for their resistance to oxidation at elevated temperatures, rendering the preferred embodiment of the present invention particularly well-suited for high temperature environments. Specifically such construction has been employed successfully over long periods of time at temperatures to approximately 1100° F. Of course, other materials suitable for the anticipated environment and having the proper electrical properties may be employed.

A major portion of the capacitance developed between the driven and sensing plates is a result of the air gap between the plates. However, the transducer A will operate with any nonconducting fluid in the gap between these plates, so long as the fluid does not physically restrict the motion of the apertured plates 32, 34, 32' and 34'.

While the transducer A according to the present invention may be structured on any scale desired, a convenient construction comprises a wafer stack 0.5 inch square and 0.091 inches tall. A preferred nominal thickness for all of the plates and layers, except for the support wafers 10, 12 and 14, is 0.001 inch. In such a construction, a convenient number of apertures 32a or 34a in apertured plates 32 or 34 has been found to be four. According to such a construction, driven plates 22 and 24 will each comprise four elongate fingers, there being four capacitance slots C1 for coupling driven plate 22 to sensing plate 28 and four capacitance slots C2 for coupling driven plate 24 to sensing plate 28. Of course, other dimensions and numbers of apertures and slots may be employed, as determined by the desired size and configuration of the transducer.

Thus, while a preferred embodiment of the present invention has been shown and described in detail, it is to be understood that such adaptations and modifications as may occur to those skilled in the art may be employed without departing from the spirit and scope of the invention, as set forth in the claims.

What is claimed is:

1. A multiaxial capacitance strain transducer comprising: a stack of at least three support wafers defining at least two slots therebetween, a first capacitance strain transducer formed in one of said slots including at least one capacitance varying element slidably carried in said one slot and extending outwardly therefrom, a second capacitance strain transducer formed in the other of said slots including at least one capacitance varying element slidably carried in said other slot and extending outwardly therefrom, said second capacitance strain transducer being angularly offset with respect to said first capacitance strain transducer by a predetermined angle and coupling means connecting the outwardly extending portions of said capacitance varying elements with the surface wherein strain is to be measured.

2. Apparatus according to claim 1 wherein said predetermined angle is substantially 90° rendering the stress response axes of said first and second capacitance strain transducers orthogonal.

3. Apparatus according to claim 1 wherein said coupling means comprises a plurality of spacers corresponding in thickness to the distances between the outwardly extending portions of said capacitance varying elements and the surface wherein strain is to be measured.

4. Apparatus according to claim 1 wherein each of said first and second capacitance strain transducers comprises at least one driven capacitance plate carried on the surface of one of said support wafers interior of said slot and a sensing capacitance plate carried on the surface of the other of said support wafers interior of said slot in parallel spaced relation to said driven capacitance plate, said capacitance varying element being diposed therebetween.

5. Apparatus according to claim 4 comprising oscillator means for applying an A.C. carrier signal to each of said driven capacitance plates and detector means for detecting the A.C. carrier signals coupled to each of said sensing capacitance plates through said respective capacitance varying elements.

6. A multiaxial capacitance strain transducer comprising: a stack of at least three support wafers defining at least two slots therebetween, a first capacitance strain transducer formed in one of said slots, a second capacitance strain transducer formed in the other of said slots, each of said first and second capacitance strain transducers comprising a pair of driven capacitance plates carried on the surface of one of said support wafers interior of said slot, a sensing capacitance plate carried on the surface of the other of said support wafers interior of said slot in parallel spaced relation to said driven capacitance plates and shutter means disposed between said driven capacitance plates and said sensing capacitance plates for varying the differential capacitance therebetween in response to the displacement of said shutter means, said first capacitance strain transducer being oriented orthogonally with respect to said second capacitance strain transducer.

7. Apparatus according to claim 6 wherein said shutter means comprises a pair of apertured plates having at least one aperture, the apertures of one of said apertured plates partially overlapping the apertures of the other of said apertured plates to define capacitance slots therethrough, the dimensions of said capacitance slots varying upon relative displacement of said apertured plates.

8. Apparatus according to claim 7 wherein said apertured plates extend outwardly from said slot on opposite sides thereof, and means for coupling the outwardly extending portions of said apertured plates with the surface therein strain is to be measured.

9. Apparatus according to claim 8 wherein said coupling means comprises a pair of spacers corresponding in thickness to the distances between the outwardly extending portions of said apertured plates and the surface wherein strain is to be measured.

10. Apparatus according to claim 7 wherein said driven capacitance plates comprise a plurality of elongate parallel spaced-apart projections, the projections of one of said driven capacitance plates being interposed between the projections of the other of said driven capacitance plates.

11. Apparatus according to claim 10 wherein the apertures of said apertured plates are generally rectangular, forming a plurality of elongate generally rectangular capacitance slots respectively aligned with the projections of said driven capacitance plates.

12. Apparatus according to claim 10 wherein said sensing capacitance plate is generally rectangular corresponding to the area of said driven capacitance plate comprising said projections.

13. Apparatus according to claim 6 comprising oscillator means for applying A.C. carrier signals to said driven capacitance plates, the signal applied to one of said driven capacitance plates being 180° out-of-phase with respect to the signal applied to the other of said driven capacitance plates, and phase-sensitive detector means for detecting the magnitude and phase of the signals coupled to said sensing capacitance plate through said shutter means.

14. Apparatus according to claim 13 wherein said detector means comprises a charge amplifier connected to said sensing capacitance plate, and feedback means coupling the output and input of said charge amplifier to produce a virtual ground potential at the amplifier input.

15. Apparatus according to claim 14 wherein said feedback means comprises a capacitor.

16. Apparatus according to claim 14 comprising a phase-sensitive demodulator connected to the output of said charge amplifier.

17. A capacitance strain transducer comprising at least two support wafers defining a slot therebetween, a pair of driven capacitance plates carried on the surface of one of said support wafers interior of said slot, a sensing capacitance plate carried on the surface of the other of said support wafers interior of said slot in parallel spaced relation to said driven capacitance plates and shutter means disposed between said driven capacitance plates and said sensing capacitance plate, said shutter means comprising a pair of apertured plates each having at least one aperture, the apertures of one of said apertured plates partially overlapping the apertures of the other of said apertured plates to define capacitance slots therethrough, the dimensions of said capacitance slots varying upon relative displacement of said apertured plates for varying the differential capacitance therebetween in response to displacement to said shutter means, said apertured plates extending outwardly from said slot on opposite sides thereof, and means for coupling the outwardly extending portions of said apertured plates with the surface wherein strain is to be measured.

18. Apparatus according to claim 17 wherein said coupling means comprises a pair of spacers corresponding in thickness to the distance between the outwardly extending portions of said apertured plates and the surface wherein strain is to be measured.

19. A capacitance strain transducer comprising at least two support wafers defining a slot therebetween, a pair of driven capacitance plates carried on the surface of one of said support wafers interior of said slot, said driven capacitance plates comprising a plurality of elongate parallel spaced-apart projections, the projections of one of said driven capacitance plates being interposed between the projections of the other of said driven capacitance plates, a sensing capacitance plate carried on the surface of the other of said support wafers interior of said slot in parallel spaced relation to said driven capacitance plates and shutter means disposed between said driven capacitance plates and said sensing capacitance plate, said shutter means comprising a pair of apertured plates each having at least one aperture, the apertures of one of said apertured plates partially overlapping the apertures of the other of said apertured plates to define capacitance slots therethrough, the dimensions of said capacitance slot varying upon relative displacement of said apertured plates for varying the differential capacitance therebetween in response to diplacement of said shutter means.

20. Apparatus according to claim 19 wherein the apertures of said apertured plates are generally rectangular, forming a plurality of elongate generally rectangular, capacitance slots respectively aligned with the projections of said driven capacitance plates.

21. Apparatus according to claim 19 wherein said sensing capacitance plate is generally rectangular corresponding to the area of said driven capacitance plates comprising said projections.

22. A capacitance strain transducer comprising:
a pair of differentially driven capacitance plates;
a sensing capacitance plate spaced parallel to said driven plates to define a channel therebetween;
first and second shutter plates disposed between said driven plates and said sensing plate in said channel, each shutter plate having therethrough at least one aperture partially overlapping an aperture in the other shutter plate to define a pair of capacitance slots through said first and second shutter plates, one of said pair of slots being aligned with the first of said driven plate pair and the other of said pair of slots being aligned with a second of said driven plate pair, the displacement of said shutter plates relative to one another varying the ratio of areas of said pair of slots upon relative displacement of said shutter plates for varying the differential capacitance between said driven capacitance plates relative to said sensing capacitance plate.

23. A capacitance strain transducer according to claim 22 further comprising oscillator means for applying A.C. carrier signals to said driven capacitance plates, the signals applied to one of said driven capacitance plates being 180° out-of-phase with respect to the signals applied to the other of said driven capacitance plates, and means for detecting the magnitude and phase of the signals coupled to said sensing capacitance plate through said shutter plates.

24. A capacitance strain transducer according to claim 23, wherein said detecting means comprises a charge amplifier coupled to said sensing capacitance plate, and feedback means coupling the output and input of said charge amplifier to maintain the input of said charge amplifier at a virtual ground potential.

25. A capacitance strain transducer according to claim 24 wherein said feedback means comprises a capacitor.

26. A capacitive strain transducer according to claim 24, wherein said detecting means further comprises a phase-sensitive demodulator connected to the output of said charge amplifier.

* * * * *